(12) United States Patent
Brush et al.

(10) Patent No.: US 8,122,362 B2
(45) Date of Patent: Feb. 21, 2012

(54) CONTROL AND VISIBILITY FOR DIGITAL CALENDAR SHARING

(75) Inventors: Alice Jane Bernheim Brush, Bellevue, WA (US); Aaron W. H. Con, Bellevue, WA (US); Danyel Fisher, Seattle, WA (US); Shawn Lee Morrissey, Bellevue, WA (US); Andrew Sullivan, Seattle, WA (US); Andrea Elaina Grimes, Atlanta, GA (US); Ryan Edward Gregg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 697 days.

(21) Appl. No.: 11/781,006

(22) Filed: Jul. 20, 2007

(65) Prior Publication Data

US 2009/0024952 A1    Jan. 22, 2009

(51) Int. Cl.
*G06F 3/00* (2006.01)

(52) U.S. Cl. ........ 715/751; 715/733; 715/741; 715/744; 715/747; 715/961; 715/963

(58) Field of Classification Search .................. 705/8, 9; 715/733, 741, 744, 747, 751, 961, 963
See application file for complete search history.

(56) References Cited

U.S. PATENT DOCUMENTS

| | | | |
|---|---|---|---|
| 6,369,840 B1 | 4/2002 | Barnett et al. | |
| 6,457,062 B1 | 9/2002 | Pivowar et al. | |
| 6,879,997 B1 | 4/2005 | Ketola et al. | |
| 7,383,291 B2 * | 6/2008 | Guiheneuf et al. | 1/1 |
| 7,467,212 B2 * | 12/2008 | Adams et al. | 709/229 |
| 7,730,392 B2 * | 6/2010 | Boyles et al. | 715/233 |
| 2001/0044827 A1 * | 11/2001 | Zhuk | 709/205 |
| 2003/0130882 A1 | 7/2003 | Shuttleworth et al. | |
| 2003/0154116 A1 * | 8/2003 | Lofton | 705/8 |

(Continued)

FOREIGN PATENT DOCUMENTS

WO    WO2005062279 A1    7/2005

OTHER PUBLICATIONS

Nagendra Nyamgondalu, "Lotus Notes Calendar and Scheduling explained!", Oct. 18, 2004, published by IBM, retrieved from http://www.ibm.com/developerworks/lotus/library/cs-pt1/.*

(Continued)

*Primary Examiner* — Steven Sax
*Assistant Examiner* — Grant D Johnson
(74) *Attorney, Agent, or Firm* — Lyon & Harr, L.L.P.; Craig S. Fischer

(57) ABSTRACT

A digital calendar sharing control and visibility system and method for providing a user with control and visibility of digital calendar sharing. The system and method enhance and improve the sharing capabilities of current digital calendar applications. The system and method include a time-based (or expiration) sharing feature that gives a user control over the expiration date of the calendar sharing. The user can expire the sharing after a certain duration or date. The user also can specify a date range or a time range that a person can view in the user's digital calendar. A sharing audits and history feature allows a user to view who has looked at their calendar and what calendar information has been viewed. A private notes section allows a user to enter information that will not be seen by another person, even if that person has sharing permission to view the user's calendar.

15 Claims, 9 Drawing Sheets

U.S. PATENT DOCUMENTS

| | | | |
|---|---|---|---|
| 2003/0164862 A1* | 9/2003 | Cadiz et al. | 345/838 |
| 2003/0167280 A1* | 9/2003 | Bradley et al. | 707/103 R |
| 2004/0267625 A1 | 12/2004 | Feng et al. | |
| 2005/0091120 A1 | 4/2005 | Auletta | |
| 2005/0251675 A1* | 11/2005 | Marcjan et al. | 713/100 |
| 2005/0262164 A1 | 11/2005 | Guiheneuf et al. | |
| 2005/0265935 A1* | 12/2005 | Hollingsworth et al. | 424/59 |
| 2006/0123008 A1 | 6/2006 | Stillion et al. | |
| 2006/0277087 A1 | 12/2006 | Error | |
| 2007/0016646 A1 | 1/2007 | Tendjoukian et al. | |
| 2007/0168216 A1* | 7/2007 | Lemelson | 705/1 |
| 2007/0186151 A1* | 8/2007 | Jyrinki | 715/507 |
| 2008/0022201 A1* | 1/2008 | Chen et al. | 715/700 |
| 2008/0040072 A1* | 2/2008 | Anderson | 702/178 |
| 2008/0040188 A1* | 2/2008 | Klausmeier | 705/9 |

OTHER PUBLICATIONS

Kent Kurchack, "Notes application strategies: User activity tracking", Mar. 15, 2004, published by IBM, retrieved from from http://www.ibm.com/developerworks/lotus/library/appstrat-usertrack/index.html.*

Anderson, M., B. Williams, Lotus notes calendar basics, UT Institute of Agriculture, Oct. 2004.

Crabtree, A.,T. Hemmings, T. Rodden, J. A. Mariani, Informing the development of calendar systems for domestic use, Proc. of the Eighth European Conf. on Comp. Supported Cooperative Work, Sep. 14-18, 2003, pp. 119-138, Helsinki, Finland.

Legault, E., Sharing your Outlook information, Microsoft Corporation, retrieved May 3, 2007 from http://office.microsoft.com/en-gb/outlook/HA011477571033.aspx.

Lookout Software, LLC, Share Microsoft Outlook calendar and contacts with OfficeCalendar, retrieved May 3, 2007 from http://www.officecalendar.com/.

Neustaedter, C., A. J. Brush, S. Greenberg, The calendar is crucial: Coordination and awareness through the family calendar, ACM Trans. Comput.-Hum. Interact., Apr. 2009, vol. 16, No. 11.

Palen, L., Social, individual and technological issues for groupware calendar systems, Conf. on Human Factors in Computing Systems, May 15-20, 1999, pp. 17-24, Pittsburgh, PA, USA.

Payne, S. J., Understanding calendar use, Human-computer Interaction, Jun. 1993, vol. 8, No. 2, pp. 83-100.

Xemicomputers, How to share calendar data in a local area network?, retrieved May 3, 2007 from http://www.xemico.com/adc/infocenter/datasharing.html.

* cited by examiner

FIG. 4

CONTROL AND VISIBILITY FOR DIGITAL CALENDAR SHARING

BACKGROUND

Digital calendars are a part of life for many busy people. A digital calendar enables a user to organize her time by storing calendar items and information related to the calendar items. Digital calendars frequently are included in time and information management software and digital calendar applications, such as Microsoft® Outlook®.

Digital calendar applications commonly include a sharing feature that allows a user to share his digital calendar with others. The user can share his calendar with others in his organization or publish his calendar to people outside the organization. Sharing may be necessary or convenient within an organization to facilitate the scheduling of events or activities such as meetings, group activities, community events, or while working together on projects. For example, digital calendar sharing allows others to view the user's digital calendar and determine when the user is free. While some of these activities are on-going, planning for other events might take only a few weeks or months.

There are several problems with digital calendar sharing in current digital calendar applications. One problem is that once the user enables sharing of her calendar the sharing is unlimited. In other words, once the user has shared her calendar with another person, that person has access to her calendar whether they need it or not. In order to stop this sharing, the user must explicitly remember to "unshare" her calendar with that person.

Another problem with sharing in current digital calendar applications is that the amount of content that other people can view on a user's calendar depends on the level of sharing the user has granted to them and whether the user has used the privacy function (such as a "Private" flag). This functionality can cause a confusing situation if the user desires to share some appointment details with other people but wants to keep some information private. In addition, a problem can arise if the user forgets to use the privacy function and the user forgets he is sharing his calendar with other people.

Another problem is that with current digital calendar applications a user receives no information about who is looking at her calendar or what information has been viewed. Current digital calendar applications inform the user about who his calendar is shared with, but the user receives no feedback if and when another person looks at his calendar. Particularly in an enterprise scenario it is desirable for the user to receive information about whether anyone else has looked at his calendar.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The digital calendar sharing control and visibility system and method disclosed herein includes features that provide a user with control and visibility of digital calendar sharing. The system and method enhance and improve the sharing functions of any digital calendar application. The system and method add to the current sharing capability of a digital calendar application the following features: (1) time-limited sharing, where the user can set expiration parameters for sharing of her digital calendar; (2) sharing audits and history, which provides the user with a history and audit trail of who has viewed her calendar and what information has been viewed; and (3) a private notes feature, which is an area in the digital calendar for each calendar entry where the user may enter information that is always kept private from any other person.

Time-based (or expiration) sharing allows the user to have control over the expiration date of the sharing. In some embodiments, this is done when the sharing relationship is established. The user is given an option to expire the sharing after a certain duration or on a certain date. In addition, the user can specify a date range or a time range that a person can view the user's digital calendar. In addition, the user can impose specific limitations on the sharing, such as a person can only view Mondays on the user's calendar. These features help avoid the situation where the calendar sharing goes on forever.

Audits and history of the sharing give a user visibility and awareness of who is viewing their calendar. Existing calendar applications tell the user who has permissions to look at their calendar, but lack any type of history of who has looked at the calendar. If this person stopped by the user's office everyday to see whether the user was in, the user would be aware. Currently, however, when a person looks at the user's digital calendar the user currently has no way of knowing. The sharing audit and history feature provides information as to who has viewed the user's calendar and what information has been viewed. This information is provided in a variety of ways and in various user interfaces.

The private notes section provides a user with an easy way to keep private information private. The user enters information into a private notes area that is provided with every calendar entry, and this information cannot be viewed by any other person. This is true even if that person has sharing permissions and privileges. The motivation for this feature comes from wanting to keep some information private on the calendar. For example, suppose the user is going to the cancer doctor. The calendar says "doctor appointment" which is fine to share with others, but the user does not want to put the doctor's name and address where it is available for all to view. The private notes area provides a place for the user to enter this information.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

FIG. 4 is an exemplary embodiment of a time-limited sharing user interface of the digital calendar sharing control and visibility system shown in FIG. 1.

DETAILED DESCRIPTION

In the following description of the digital calendar sharing control and visibility system and method, reference is made to the accompanying drawings, which form a part thereof, and in which is shown by way of illustration a specific example whereby the digital calendar sharing control and visibility system and method may be practiced. It is to be understood that other embodiments may be utilized and structural changes may be made without departing from the scope of the claimed subject matter.

I. General Overview

Figure 1:
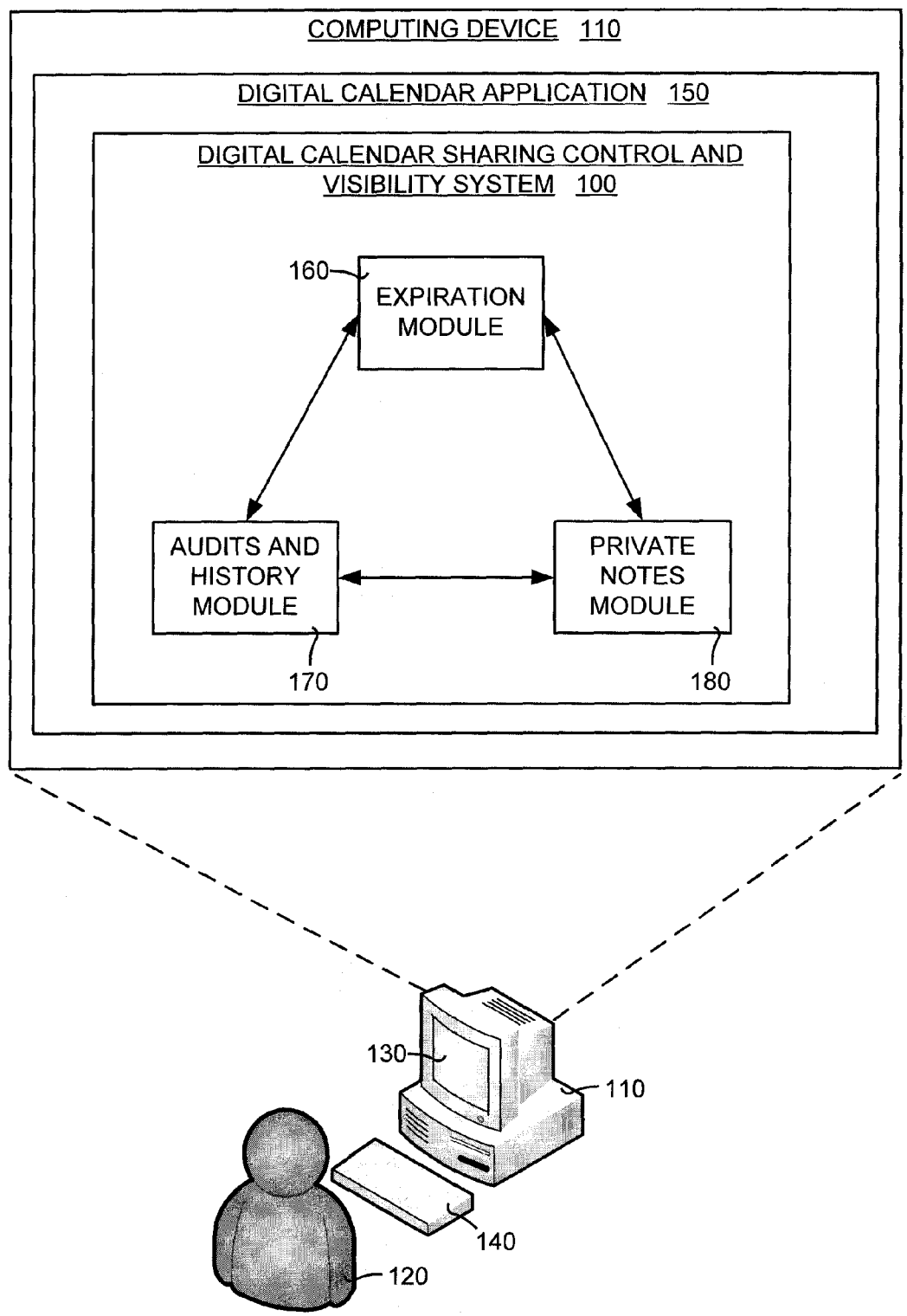
FIG. 1 is a block diagram illustrating the general overview of the digital calendar sharing control and visibility system and method.

FIG. 1 is a block diagram illustrating the general overview of the digital calendar sharing control and visibility system 100 and method. The system 100 and method are designed to operate within a computing environment on a computing device 110. As described below, this computing device 110 can be any type of device utilizing a processor.

The digital calendar sharing control and visibility system 100 and method displays information to a user 120 through a display device 130 that is in communication with the computing device 110. The user 120 can input commands and data to the computing device 110 through input devices, such as a keyboard 140. It should be noted that the dashed lines in FIG. 1 are meant to indicate that the boxes in the top half of the figure are a representation of what is contained on the computing device 110.

Specifically, the digital calendar sharing control and visibility system 100 operates within a digital calendar application 150 (such as Microsoft® Outlook®). Moreover, both the digital calendar application 150 and the digital calendar sharing control and visibility system 100 reside on the computing device 110. The digital calendar sharing control and visibility system 100 includes an expiration module 160, an audits and history module 170, and a private notes module 180. The modules 160, 170, 180 are illustrated in FIG. 1 as interconnected to indicate that any one, any two, or all of the modules 160, 170, 180 may be used to provide control and visibility for sharing within the digital calendar application 150.

The expiration module 160 allows time-limited sharing such that the user 120 can override the default expiration of sharing and enter custom sharing parameters. The audits and history module 170 makes the user 120 aware of who has been viewing the user's digital calendar. The private notes module 180 provides an area where the user 120 may enter and store information that cannot be shared and can never be viewed by others except the user 120.

Figure 2:
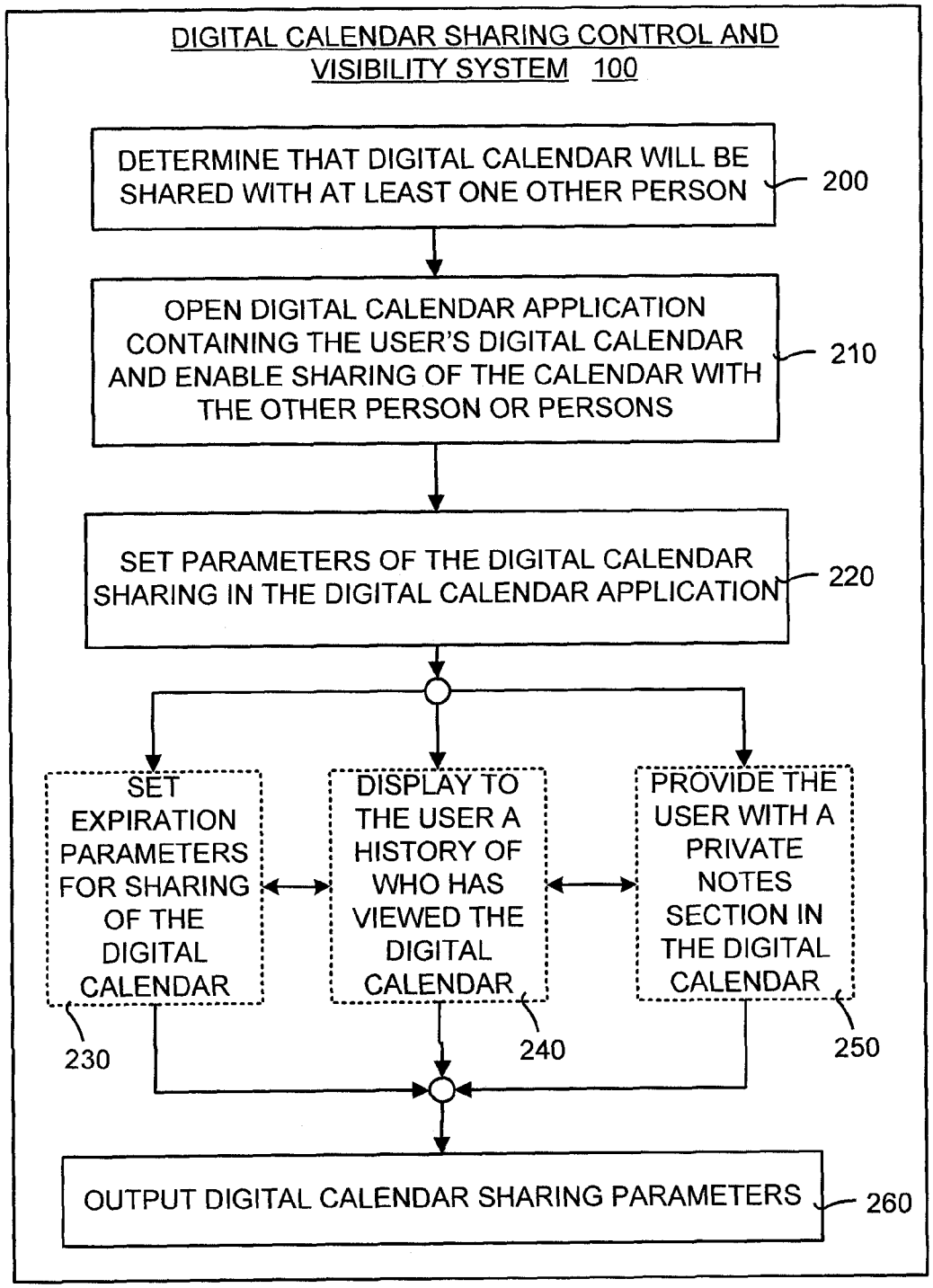
FIG. 2 is a block diagram illustrating the general overview of the operation of the method of the digital calendar sharing control and visibility system shown in FIG. 1.

FIG. 2 is a block diagram illustrating the general overview of the operation of the method of the digital calendar sharing control and visibility system 100 shown in FIG. 1. In general, the method provides a user with control and visibility for digital calendar sharing to better meet the needs of the user sharing the digital calendar. More specifically, the method begins by determining that the digital calendar will be shared with at least one other person (box 200). Once it is determined that the digital calendar will be shared, the digital calendar application 150 containing the user's digital calendar is opened and sharing of the calendar is enabled (box 210). Next, sharing parameters of the digital calendar are set by the user 120 in the digital calendar application 150 (box 220).

There are many sharing parameters that may be set by the user 120 in the digital calendar application 150. These available sharing parameters are dependent upon which digital calendar application is being used. The digital calendar control and visibility method augments the sharing parameter of any digital calendar application. In general, the sharing parameters that are provided by the digital calendar control and visibility method are threefold. These include setting expiration parameters for sharing of the digital calendar (box 230). In addition, the system 100 can display to the user 120 a history of who has viewed the digital calendar (box 240). Moreover, the system 100 can provide the user 120 with a private notes section in the digital calendar that keeps the user's text and notes concealed from other persons, even if the other persons have sharing privileges (box 250). As shown in FIG. 2 by the dotted lines, any combination of these sharing parameters of the system 100 can be used. The system 100 then outputs digital calendar sharing parameters that have been selected by the user (box 260).

II. Operational Details

As stated above, the digital calendar control and visibility method enhances digital calendar sharing in three broad areas. Namely, enhancement is provided in time-limited sharing, sharing audits and history, and a private notes section. Each of these areas will be discussed in further detail.

Time-Limited Sharing

In current digital calendar applications, once a user has shared her digital calendar with another person that person has access to the digital calendar whether they need it or not. This sharing continues until the user explicitly remembers to "unshare" her calendar with that person. The digital calendar sharing control and visibility system 100 and method includes a "time-based" sharing of digital calendars such that all sharing access is timed-out by default unless the user 120 decides to renew expiring permissions.

The digital calendar sharing control and visibility system 100 and method gives the user 120 the option of limiting the length of the sharing. In some embodiments, this option can be exercised by the user 120 at the time the user 120 shares her calendar, either when the sharing relationship is established or when the relationship is being renewed. In alternate embodiments, the sharing relationship length can be edited at any time, not just at the beginning or when the relationship is up for renewal. If the user 120 limits the length of time she shares her calendar with someone then she will receive a notification, perhaps through e-mail or other means, when the sharing is about to expire. At that point the user has the option to extend the sharing or let it expire.

By way of example, assume that when John sets up the sharing of his digital calendar he has the option of sharing his calendar for 3, 6, 9 months or forever. Since John knows that the project he is currently working on will last about 2 months he opts to share his calendar for 3 months. Each month an automatic, system-generated e-mail is sent to John. This e-mail indicates who has access to his calendar and the expiration date of each sharing permission. In 3 months, John is done working with Jeff and Mark so he does nothing and lets the sharing permissions with them expire. However, since John is still working with Ann he renews his calendar sharing with her. An additional benefit of time-based sharing is that it gives users "plausible deniability." For example, if Jeff tried to check John's calendar once he became his boss and then no longer had access, John could easily say "Oh, I forgot to renew" rather than being in the current situation where it would be obvious to Jeff that John has explicitly unshared access to his calendar.

Figure 3:
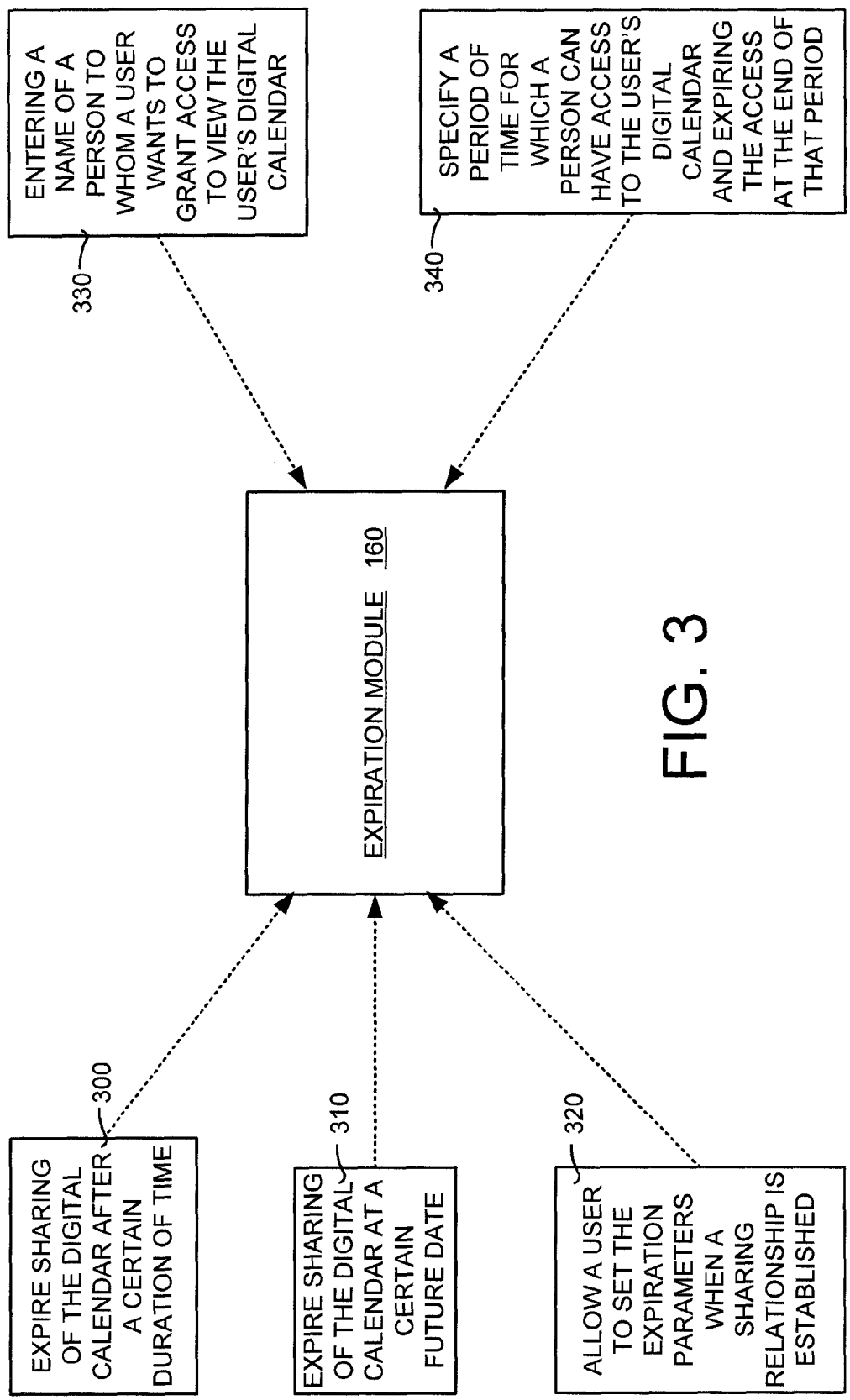
FIG. 3 is a flow diagram illustrating the operation of the expiration module shown in FIG. 1.

FIG. 3 is a flow diagram illustrating the operation of the expiration module 160 shown in FIG. 1. In general, the expiration module 160 contains a number of features that may be used to limit the amount of time that the digital calendar sharing continues. The dotted lines in FIG. 3 indicate that each of the features is optional and one or more of these features may be used by the module 160. As shown in FIG. 3, the module 160 may include expiring the sharing of the digital calendar after a certain duration of time (box 300). Another feature is expiring sharing of the digital calendar at a date that is in the future (box 310).

The expiration module 160 also allows the user 120 to set the expiration parameters (such as the expiration date or the duration of the sharing) when the sharing relationship is established (box 320). The module 160 also includes the feature of entering a name of a person to whom the user 120 wants to grant access (or sharing privileges) to view the user's digital calendar (box 330). The module 160 also allows the user 120 to specify a period of time for which a person can have access to the user's digital calendar and expires the access at the end of that period (box 340). The module 160 allows the user 120 to edit the expiration parameters for a person at any time before, after, and during the sharing relationship.

Figure 4:
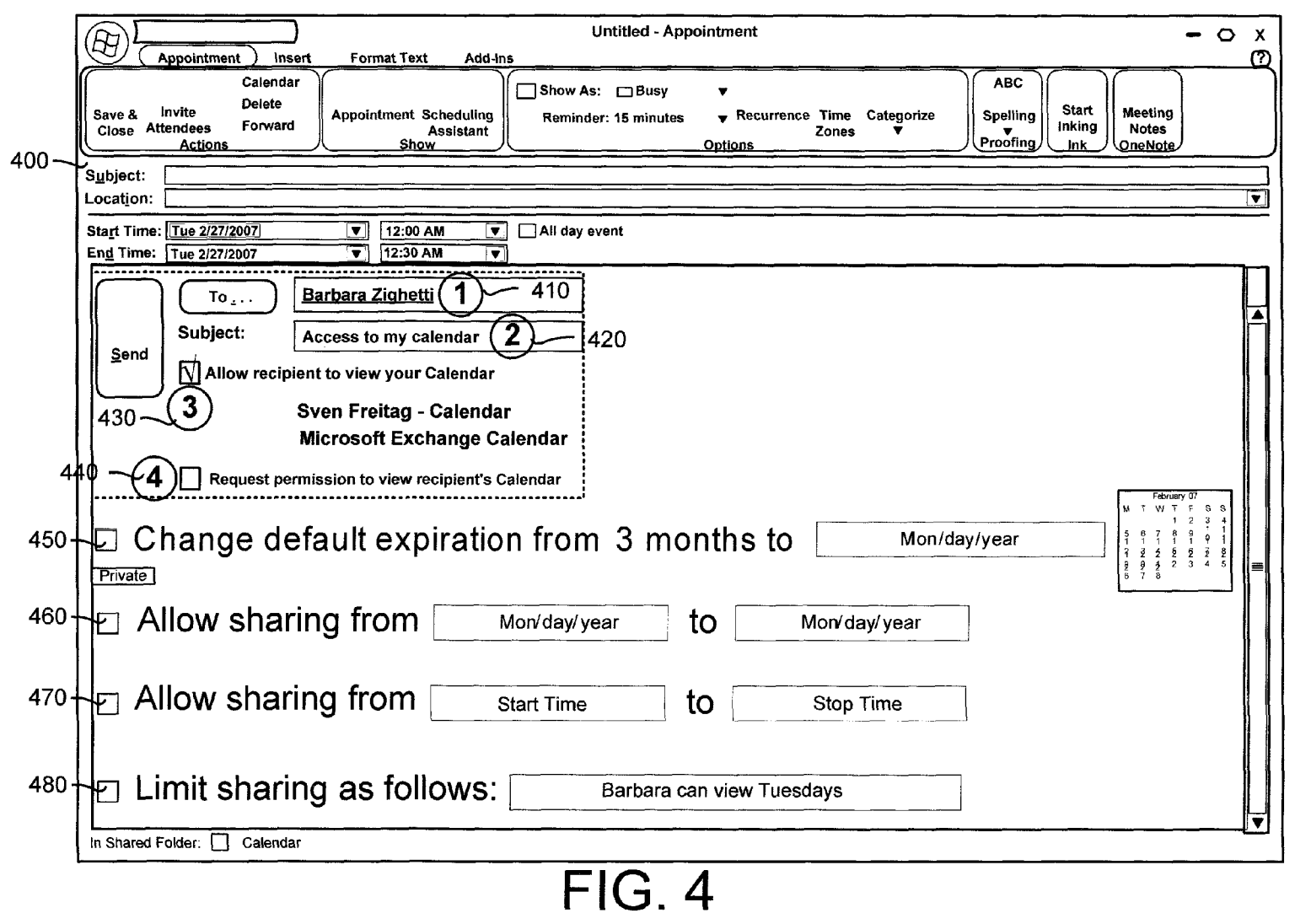

There are a number of different ways that a user interface for sharing a calendar might be modified to add a time-based element. FIG. 4 is an exemplary embodiment of a time-limited sharing user interface 400 of the digital calendar sharing control and visibility system 100 shown in FIG. 1. This exemplary embodiment is based on the user interface for Microsoft® Outlook® 2007. Many calendar applications, such as Microsoft® Outlook®, follow a four-step process to share a calendar. First, the name of the person to whom the user 120 wants to grant access to view his calendar is entered (410). Next, the user 120 types a subject for the e-mail message (420). The user then selects the check box to grant the recipient permission to view the user's calendar (430). In addition, the user 120 is given the option to select a check box to ask the recipient to share his or her calendar with the user 120 (440). This is an optional step.

The user interface 400 further includes additional elements that allow the user 120 to change a time-based parameter of the shared calendar from the default (which is typically set to expire in three months) to any date the user 120 desires (450). At the end of that expiration date, the user 120 can either extend the expiration from any time period or let the sharing expire. In addition, instead of sharing limited by length of time, the user interface 400 includes a "Date Range" area 460 that allows the user 120 to share a limited part of her calendar as a date range. In other words, a person is allowed to see the user's calendar from a certain start date until a certain stop date. For example, the user 120 may allow Barbara to see only the portion of his calendar from June 21 until July 15. The user interface 400 also includes a "Time Range" area 470 that allows sharing of a limited part of the calendar as a time range. For example, Barbara may be allowed to see only 8:00 a.m. until 5:00 p.m. on the user's calendar. Moreover, the user interface 400 includes a "Sharing Limitations" area 480 that allows the user 120 to share a limited part of the calendar with other restrictions. For example, Barbara may be allowed only to see Tuesdays on the user's calendar.

Sharing Audits and History

The digital calendar sharing control and visibility system 100 and method includes a sharing audit and history feature that allows the user 120 to know who has looked at his calendar. In some embodiments, this is achieved by either by giving the user 120 a place they could look up the information or by notifying the user 120 when someone looks at their calendar (such as through e-mail or other means).

The general idea of the sharing audit and history feature is that users should be able to have an awareness of who is looking at their calendar. In effect, the sharing audit and history feature is an audit trail that gives a user the ability to know who has recently viewed his calendar.

Figure 5:
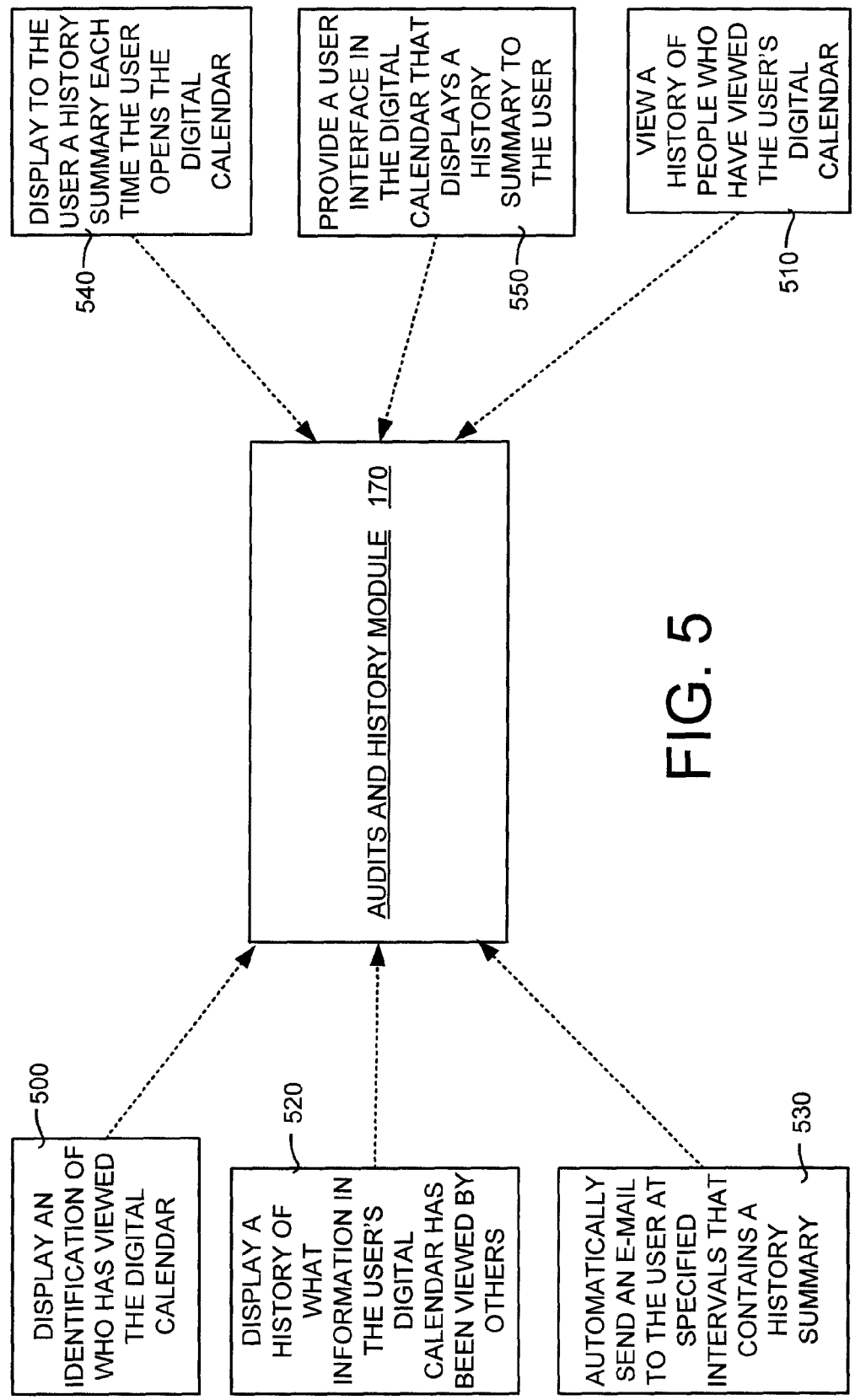
FIG. 5 is a flow diagram illustrating the operation of the audits and history module shown in FIG. 1.

FIG. 5 is a flow diagram illustrating the operation of the audits and history module shown in FIG. 1. In general, the audits and history module 170 contains a number of features that may be used to track and view who has been viewing the digital calendar. The dotted lines in FIG. 5 indicate that each of the features is optional and one or more of these features may be used by the module 170.

As shown in FIG. 5, the module 170 may include displaying an identification of persons who have viewed the user's digital calendar (box 500). Moreover, the module 170 allows the user 120 to view a history of people who have viewed the user's digital calendar (box 510). In addition to displaying who has viewed the digital calendar, the module 170 can also display a history of what information in the user's digital calendar has been viewed by others (box 520). For example, if Bob was looking at Gayle's calendar and viewing Gayle's appointments for Tuesday, July $10^{th}$ and Thursday, July $12^{th}$, the module 170 notifies Gayle that Bob has viewed her calendar and that Bob looked at Tuesday, July $10^{th}$ and Thursday, July $12^{th}$ during his visit.

This history can be used not only to track who has looked at the user's calendar and what they have looked at, but also whether the person needs more access to the calendar. In this case, the history will remind the user 120 to allow that person to view more information about the user's calendar. On the other hand, if the user 120 knows that someone is looking at her calendar but does not need to, the history will remind the user 120 to remove permission of that person to look at her calendar. The audit and history information tell the user 120 who looked at his calendar, what information they looked at (such as which weeks did they look at), and whether the person opened one of the user's appointments.

The module 170 also provides a number of options to display the audit and history information. In some embodiments, the module 170 automatically sends an e-mail to the user 120 at specified intervals (box 530). The e-mail contains a history summary. The specified interval could be an e-mail every month, week, or day. In addition, in other embodiments the module 170 displays to the user 120 a history summary every time the user 120 opens her calendar (box 540). In other embodiments, the module 170 provides a user interface in the digital calendar that displays a history summary to the user (box 550).

Figure 6:
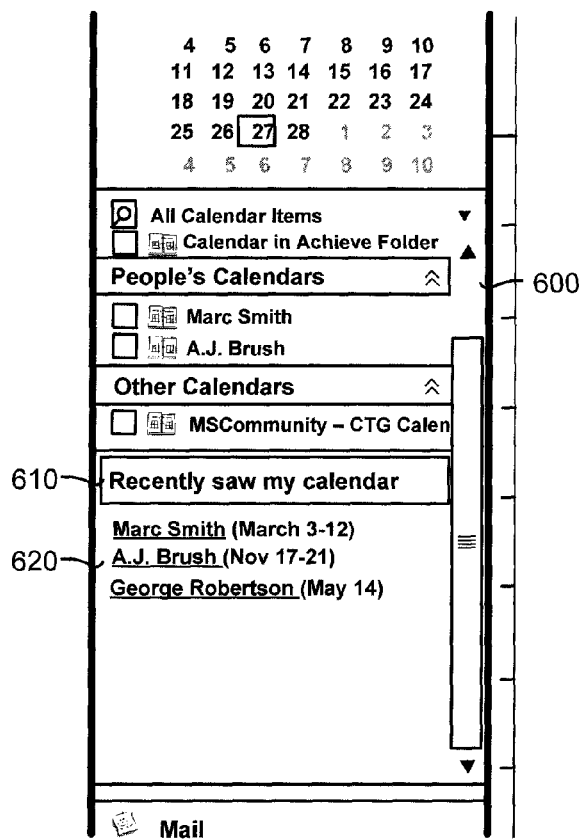
FIG. 6 is a first exemplary embodiment of a sharing audit user interface of the digital calendar sharing control and visibility system shown in FIG. 1.
Figure 7:
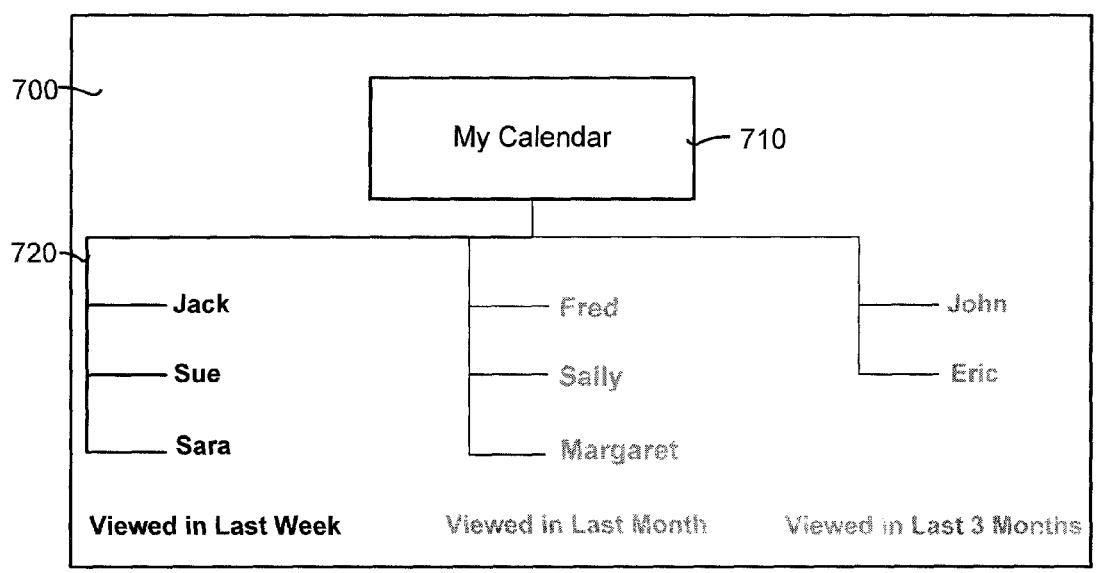
FIG. 7 is a second exemplary embodiment of the sharing audit user interface of the digital calendar sharing control and visibility system shown in FIG. 1.

FIGS. 6 and 7 are different embodiments of a sharing audits user interface implementations of the audit trail. In particular, FIG. 6 is a first exemplary embodiment of a first sharing audit user interface 600 of the digital calendar sharing control and visibility system 100 shown in FIG. 1. In this embodiment, this user interface 600 is displayed to the user 120 when the user 120 opens his digital calendar application 150. The first user interface 600 includes a "Recently Viewed" area 610 that displays a list 620 of names of people who have recently viewed the user's digital calendar.

FIG. 7 is a second exemplary embodiment of a second sharing audit user interface 700 of the digital calendar sharing control and visibility system 100 shown in FIG. 1. In this embodiment, the user interface 700 is displayed to the user 120 as a specific user interface 700. The user interface 700 contains a "My Calendar" area 710. In this area 710, there is a chronological listing 720 of the names of persons who have recently view the user's digital calendar. In addition, the font the names is brighter for those who have viewed more recently, and the font fades lighter and lighter the further back in time the list goes. For example, as shown in FIG. 7, the names of persons who have viewed the user's calendar in the last week are brighter than those who have viewed in the past month. Similarly, the names of those who viewed in the past month are brighter than those who viewed in the past three months. It should be noted that these user interfaces are merely examples, and each type of digital calendar application will implement these ideas in a way that matches that application's user interface.

Privates Notes Section

The digital calendar sharing control and visibility system 100 and method includes a privates notes feature that allows the user 120 to enter information into his digital calendar that will always be kept private and cannot be seen by others. In current digital calendar applications, the amount of content other people can see for appointments on the user's calendar depends on the level of sharing the user 120 has granted to them. In addition, many current digital calendar applications include a "Private" flag where a user can label the content as private. However, this can cause a confusing situation if the user 120 wants to share some details with other people but wants to keep some information private. Or in some cases, the user 120 may forget to use the private flag because she does not remember she is sharing her calendar with other people. The private notes feature of the digital calendar sharing control and visibility system 100 and method provides the user 120 with an explicit section of an appointment in the digital calendar that is never shared. This gives the user 120 a safe place to put extra information without having to remember how much of her calendar is being shared and with whom.

Figure 8:
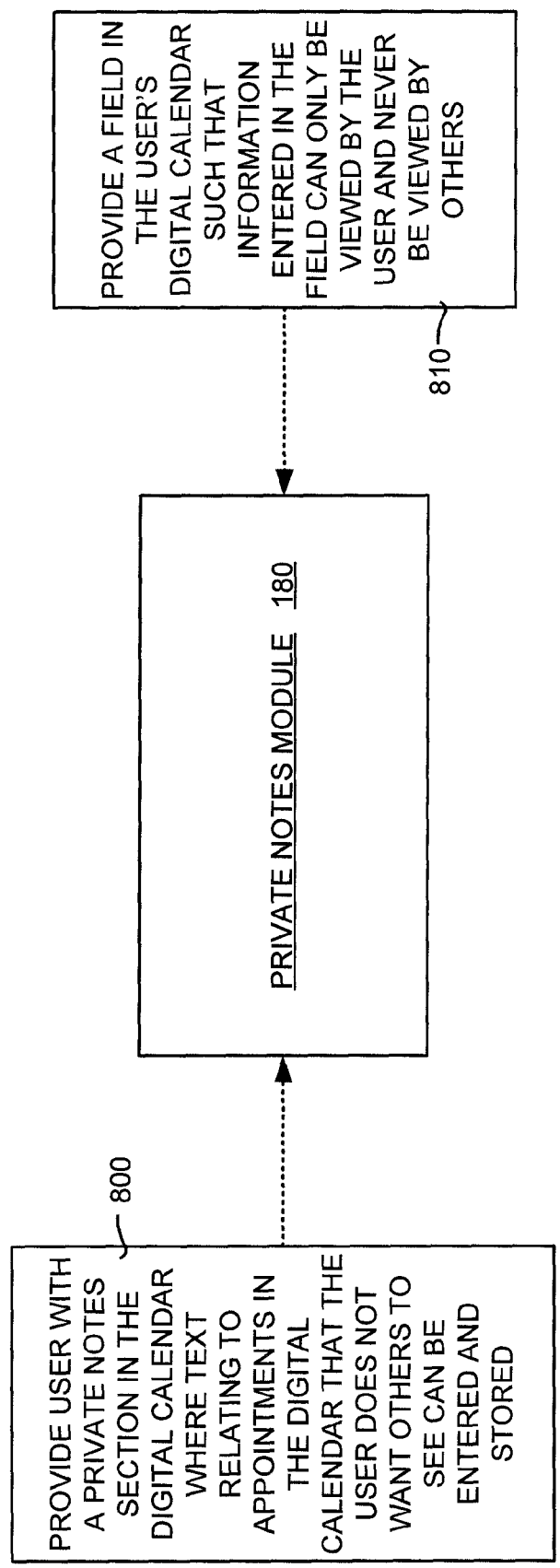
FIG. 8 is a flow diagram illustrating the operation of the private notes module shown in FIG. 1.

FIG. 8 is a flow diagram illustrating the operation of the private notes module 180 shown in FIG. 1. Generally, the private notes module 180 contains features that may be used to keep a user's notes and text private. Once again, the dotted lines in FIG. 8 indicate that each of the features is optional and one or more of these features may be used by the module 180.

As shown in FIG. 8, the module 180 provides the user 120 with a private notes section in the digital calendar (box 800). This section is where text relating to appointments in the digital calendar (or other data) may be entered and stored. The data in this private notes section cannot be seen by any others except the user 120. In some embodiments, for every input in the digital calendar there is a private notes section. The user 120 cannot share the information in the private notes section, even if she wanted to. In addition, the module 180 provides the user 120 with a field in the user's digital calendar such that information entered in the field can only be viewed by the user 120 and can never by viewed by others (box 810).

Figure 9:
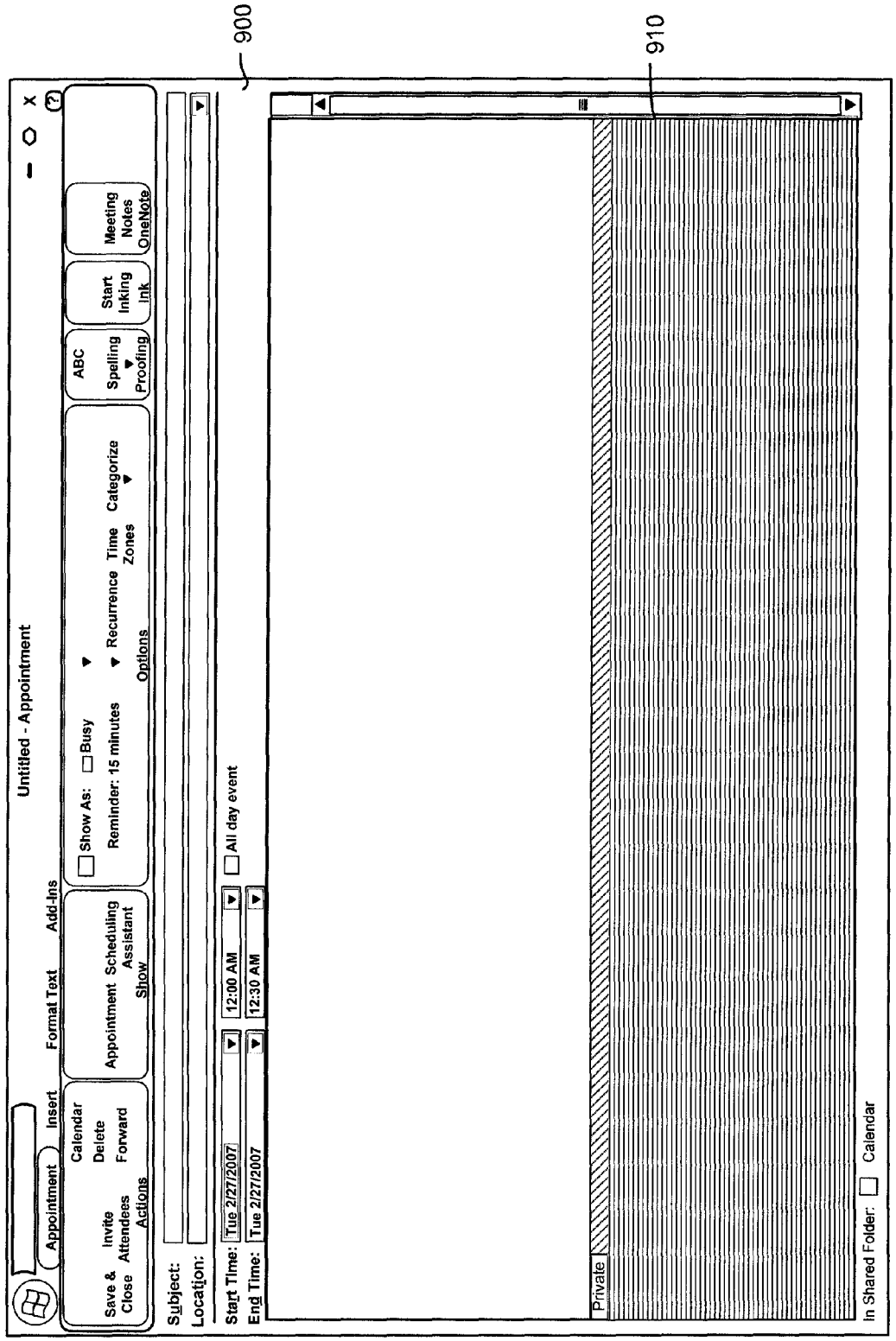
FIG. 9 is an exemplary embodiment of a private notes user interface of the digital calendar sharing control and visibility system shown in FIG. 1.

FIG. 9 is an exemplary embodiment of a private notes user interface 900 of the digital calendar sharing control and visibility system 100 shown in FIG. 1. In some embodiments, the user interface 900 includes an "Always Private" 910 that is marked "Private" and has a different color background from the rest of the interface 900. In other embodiments, having an "Always Private" section requires adding an additional field to each calendar event that is only visible to the owner of the calendar. The user interface for the calendar event also is changed to facilitate an "Always Private" area.

III. Exemplary Operating Environment

The digital calendar sharing control and visibility system 100 and method is designed to operate in a computing environment. The following discussion is intended to provide a brief, general description of a suitable computing environment in which the digital calendar sharing control and visibility system 100 and method may be implemented.

Figure 10:
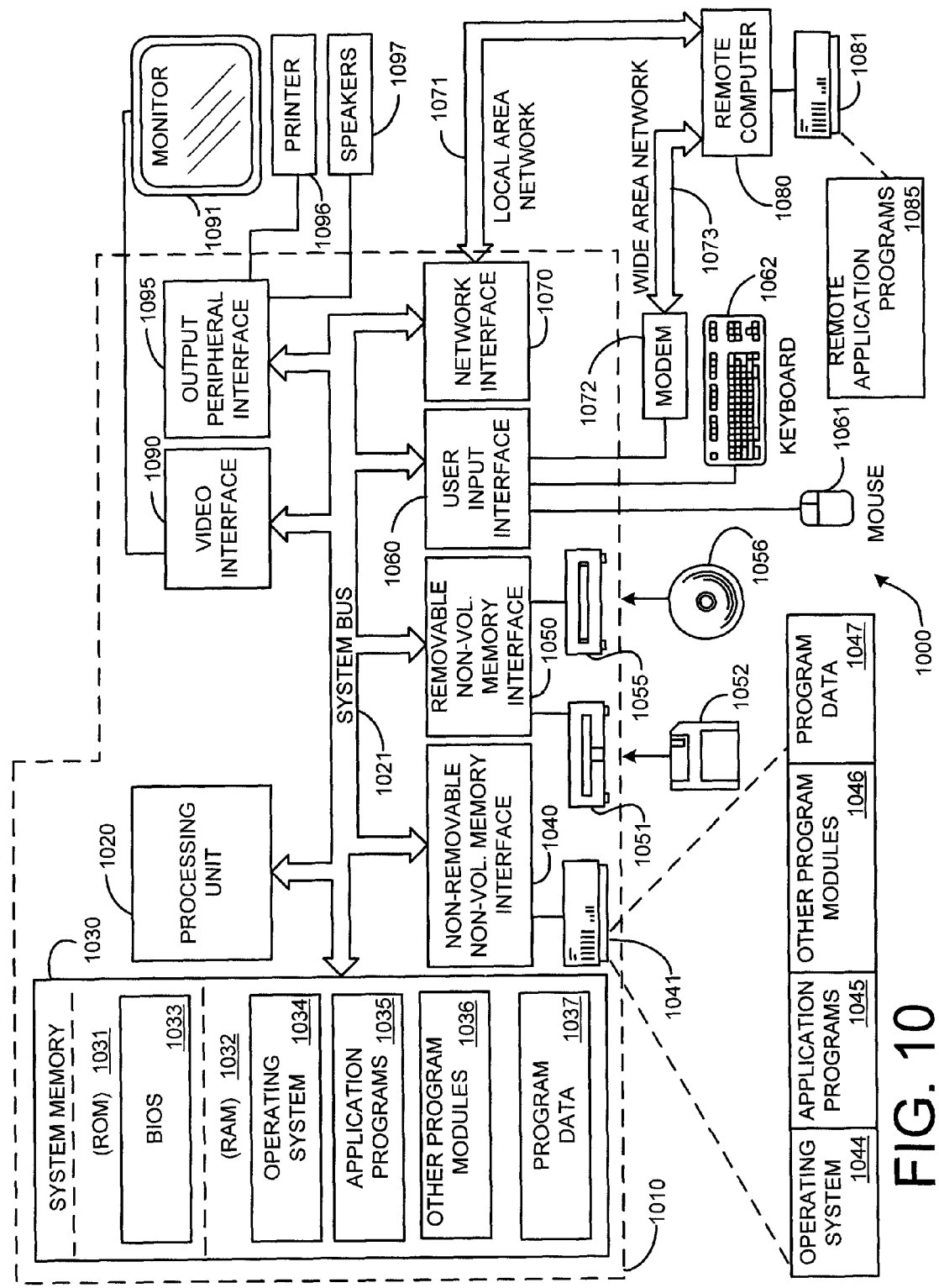
FIG. 10 illustrates an example of a suitable computing system environment in which the digital calendar sharing control and visibility system and method shown in FIGS. 1-9 may be implemented.

FIG. 10 illustrates an example of a suitable computing system environment in which the digital calendar sharing control and visibility system 100 and method may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment.

The digital calendar sharing control and visibility system 100 and method is operational with numerous other general purpose or special purpose computing system environments or configurations. Examples of well known computing systems, environments, and/or configurations that may be suitable for use with the digital calendar sharing control and visibility system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The digital calendar sharing control and visibility system 100 and method may be described in the general context of computer-executable instructions, such as program modules, being executed by a computer. Generally, program modules include routines, programs, objects, components, data structures, etc., that perform particular tasks or implement particular abstract data types. The digital calendar sharing control and visibility system 100 and method may also be practiced in distributed computing environments where tasks are performed by remote processing devices that are linked through a communications network. In a distributed computing environment, program modules may be located in both local and remote computer storage media including memory storage devices. With reference to FIG. 10, an exemplary system for the digital calendar sharing control and visibility system 100 and method includes a general-purpose computing device in the form of a computer 1010 (the computer 1010 is one example of the computing device 110 shown in FIG. 1).

Components of the computer 1010 may include, but are not limited to, a processing unit 1020 (such as a central processing unit, CPU), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer readable media. Computer readable media can be any available media that can be accessed by the computer 1010 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1010. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within the computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD-ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1050, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information (or data) into the computer 1010 through input devices such as a keyboard 1062, pointing device 1061, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1020 through a user input interface 1060 that is coupled to the system bus 1021, but may be connected by other interface and bus structures, such as, for example, a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The foregoing Detailed Description has been presented for the purposes of illustration and description. Many modifications and variations are possible in light of the above teaching.

It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for providing control and visibility of digital calendar sharing, comprising:
   determining that the digital calendar of a user will be shared with at least one other person;
   opening a digital calendar application containing the user's digital calendar and enabling sharing of the digital calendar with the other person or persons;
   displaying to the user a history of other users who have recently viewed the user's digital calendar and what information in the user's digital calendar has been viewed by the other users, the information further comprising which weeks were viewed and which appointments of the user were opened;
   automatically reminding and recommending to the user, based on the history, that the user either grant more access to one of the other users to allow the other user to view more of the user's digital calendar or that the user remove permission for the other user to access the user's digital calendar;
   setting parameters of the digital calendar sharing in the digital calendar application such that the user determines an amount of control and visibility available to the other user, wherein setting parameters includes setting expiration parameters for sharing of the digital calendar; and
   automatically providing a private notes section for every calendar entry in the digital calendar such that data can be stored in the private notes section that is only viewable by the user and can never be viewed by or shared with others.

2. The method of claim 1, further comprising expiring the sharing of the digital calendar after a certain duration of time.

3. The method of claim 1, further comprising expiring the sharing of the digital calendar at a certain future date.

4. The method of claim 1, further comprising allowing the user to set the expiration parameters at the time, wherein the expiration parameters can be edited by the user at any of the following times: (a) when a sharing relationship with the other person or persons is established; (b) when the sharing relationship with the other person or persons is renewed; (c) at any time after the sharing relationship is established.

5. The method of claim 1, further comprising displaying an identification of who has viewed the user's digital calendar.

6. The method of claim 5, further comprising automatically sending an e-mail to the user at specified intervals that contains a summary of who has been viewing the digital calendar, when they viewed the digital calendar, and what information in the digital calendar that was viewed.

7. The method of claim 5, further comprising displaying to the user, each time the user opens the digital calendar, a summary of who has been viewing the digital calendar and when they viewed the digital calendar.

8. The method of claim 5, further comprising providing a user interface in the digital calendar that displays to the user a summary of who has been viewing the digital calendar, when they viewed the digital calendar, and what information of the digital calendar that they viewed.

9. A digital calendar sharing user interface displayed on a display device of a computing device for sharing a digital calendar of a user with another person, comprising:
   a time-limited sharing user interface having a sharing expiration area that displays a current monthly calendar such that the user can set any future date on the calendar in which the digital calendar sharing with the person will expire;
   a sharing audit user interface having a "Recently Viewed" area that displays to the user a history of other users who have recently viewed the user's digital calendar and what information in the user's digital calendar has been viewed by the other users and automatically reminds and recommends to the user, based on the history, that the user either grant more access to one of the other users to allow the other user to view more of the user's digital calendar or that the user remove permission for the other user to access the user's digital calendar, the information further comprising which weeks were viewed and which appointments of the user were opened;
   a private notes user interface having an "Always Private" area automatically provided for every calendar entry in the digital calendar without the user having to perform an action to create the area that allows the user to store text and other data such that the text and other data can only be viewed by the user and can never be viewed by or shared with others.

10. The user interface of claim 9, wherein the time-limited sharing user interface further comprises a "Date Range" area that allows the user to limit a portion of the digital calendar sharing to a specific date range.

11. The user interface of claim 10, wherein the time-limited sharing user interface further comprises a "Time Range" area that allows the user to limit a portion of the digital calendar sharing to a specific time range on certain days.

12. The user interface of claim 11, wherein the time-limited sharing user interface further comprises a "Sharing Limitations" area that allows the user to specify restrictions and limitations on the digital calendar sharing with the person.

13. The user interface of claim 9, wherein the time-limited sharing user interface further comprises a history of what information in the digital calendar has been viewed by the other person.

14. The user interface of claim 9, wherein the "Recently Viewed" area further comprises a chronological listing of the names of persons who have recently viewed the user's digital calendar such that a font of the names of the persons who viewed the user's digital calendar more recently are brighter than a font of the names of the persons who viewed the user's digital calendar a longer time ago.

15. A computer-readable storage medium, which does not consist of a modulated data signal, having stored thereon computer-executable instructions executable by a processor for providing control and visibility for digital calendar sharing, comprising:
   entering a name of a person to whom a user wants to grant access to view the user's digital calendar;
   specifying a period of time for which the person can have access to the user's digital calendar such that the digital calendar sharing expires at the end of the period of time;
   displaying to the user a history of other users who have recently viewed the user's digital calendar and what information in the user's digital calendar has been viewed by the other users, the information further comprising which weeks were viewed and which appointments of the user were opened;

automatically reminding and recommending to the user, based on the history, that the user either grant more access to one of the other users to allow the other user to view more of the user's digital calendar or that the user remove permission for the other user to access the user's digital calendar; and automatically providing the user with a private notes section for every calendar entry in the digital calendar without the user having to perform an action to create the section where data can be stored that is only viewable by the user and can never be viewed by or shared with others.

* * * * *